United States Patent
Song et al.

(10) Patent No.: US 9,697,797 B2
(45) Date of Patent: Jul. 4, 2017

(54) METHOD AND APPARATUS FOR DISPLAYING CONTENT

(71) Applicant: THOMSON LICENSING, Issy de Moulineaux (FR)

(72) Inventors: Wenjuan Song, Beijing (CN); Jianping Song, Beijing (CN); Lin Du, Beijing (CN)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/648,699

(22) PCT Filed: Nov. 30, 2012

(86) PCT No.: PCT/CN2012/085640
§ 371 (c)(1),
(2) Date: May 30, 2015

(87) PCT Pub. No.: WO2014/082290
PCT Pub. Date: Jun. 5, 2014

(65) Prior Publication Data
US 2015/0302825 A1    Oct. 22, 2015

(51) Int. Cl.
G09G 5/02    (2006.01)
G09G 5/10    (2006.01)
G09G 5/18    (2006.01)
G09G 3/16    (2006.01)
G09G 3/24    (2006.01)
G06F 1/32    (2006.01)
(Continued)

(52) U.S. Cl.
CPC ............. *G09G 5/10* (2013.01); *G06F 1/3206* (2013.01); *G06F 1/3265* (2013.01); *G06F 3/0416* (2013.01); *G06F 3/0488* (2013.01); *G09G 5/18* (2013.01); *Y02B 60/1242* (2013.01)

(58) Field of Classification Search
CPC combination set(s) only.
See application file for complete search history.

(56) References Cited

U.S. PATENT DOCUMENTS

2003/0146897 A1*  8/2003  Hunter .................. G09G 3/342
                                                                 345/102
2007/0279339 A1  12/2007  Huang et al.
(Continued)

FOREIGN PATENT DOCUMENTS

CN      101346755      1/2009
CN      101385071      3/2009
(Continued)

OTHER PUBLICATIONS

Search Report Dated Sep. 19, 2013.

*Primary Examiner* — Wesner Sajous
(74) *Attorney, Agent, or Firm* — Jack Schwartz & Associates, PLLC

(57) ABSTRACT

It is provided a method for displaying content on a screen where light intensity of each pixel of the screen is adjustable. The method comprises steps of receive a touch of a touching object on the screen; and adjusting light intensity so as to make surrounding pixels of a contact point between the touching object and the screen have a higher intensity and rest pixels have no light intensity or a lower light intensity, wherein, the lower light intensity enables content displayed on corresponding pixels perceptible to a user.

6 Claims, 5 Drawing Sheets

(51) Int. Cl.
*G06F 3/048* (2013.01)
*G06F 3/0488* (2013.01)
*G06F 3/041* (2006.01)

(56) References Cited

U.S. PATENT DOCUMENTS

| | | |
|---|---|---|
| 2008/0088544 A1 | 4/2008 | Chen et al. |
| 2008/0238880 A1 | 10/2008 | Miwa |
| 2010/0123678 A1 | 5/2010 | Kim et al. |
| 2010/0172332 A1 | 7/2010 | Rao |
| 2010/0182332 A1 | 7/2010 | Ozawa et al. |
| 2010/0253644 A1 | 10/2010 | Lee et al. |
| 2011/0014955 A1 | 1/2011 | Kim et al. |
| 2011/0273377 A1* | 11/2011 | Merz ................ G09G 3/20 345/173 |
| 2015/0084997 A1* | 3/2015 | Kim ................ G09G 3/2003 345/690 |
| 2015/0364107 A1* | 12/2015 | Sakariya ............ G06F 3/0412 345/174 |

FOREIGN PATENT DOCUMENTS

| | | |
|---|---|---|
| CN | 101430597 | 5/2009 |
| EP | 2109030 | 10/2009 |
| EP | 2521118 | 7/2012 |
| JP | 2008250804 | 3/2007 |
| JP | 2007316606 | 12/2007 |
| JP | 2011216066 | 6/2010 |
| JP | 2010182062 | 8/2010 |
| KR | 2010054274 | 5/2010 |
| WO | WO2007051288 | 5/2007 |
| WO | WO2007071049 | 6/2007 |

* cited by examiner

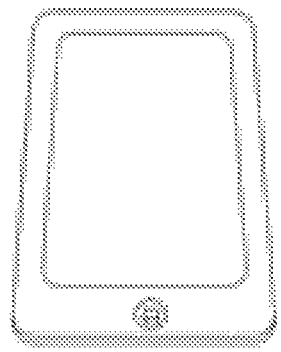
Fig. 2b
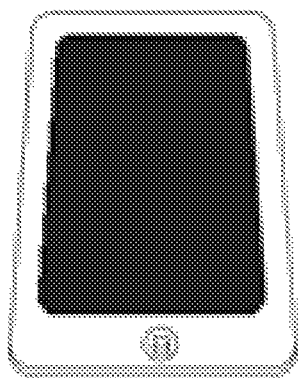
Fig. 3a
Fig. 3b

METHOD AND APPARATUS FOR DISPLAYING CONTENT

This application claims the benefit, under 35 U.S.C. §365 of International Application PCT/CN2012/085640, filed Nov. 30, 2012, which was published in accordance with PCT Article 21(2) on Jun. 5, 2014 in English.

TECHNICAL FIELD

The present invention relates to power saving, and more particularly relates to a method and an apparatus for saving power consumption of display screen.

BACKGROUND

One of the significant problems on mobile devices is the power consumption. Everyone seems to have the experience to drain out the battery of a phone or any other mobile device. Without the support of the electricity, the mobile device becomes useless and all its functionalities stop working. Traditionally, the manufacturers develop large capacity battery in order to provide longer working hours for the mobile device. However, as the screen size of mobile device becomes larger and larger, the power consumption is increased accordingly.

As early as 2008, TPO announced a power saving display sensor. Taiwanese display manufacturer figured out how to integrate ambient light sensors into a standard LCD screen, resulting in more accurate light readings than the usual external sensor setup. The system can also compensate for temperature with the addition of a black level sensor, which means the screen can detect light levels from 3 to 10,000 lux and adjust the backlight accordingly. The sensors were designed for small screens in mobile devices, and the system is estimated to reduce overall power consumption around 30% under normal use.

In 2009, ROHM Semiconductor announced a new family of analog and digital Ambient Light Sensor (ALS) ICs for the efficient control of LED backlighting for LCD-equipped devices. It can save 50% or more of the overall power consumption for operating LCD-equipped devices by adjusting the LED backlight intensity to compensate for varying ambient light levels.

The present invention provides an enhanced method for saving power consumption of display screen regardless of whether it is used by a portable device or not.

SUMMARY

According to an aspect of present invention, it is provided a method for displaying content on a screen where light intensity of each pixel of the screen is adjustable. The method comprises steps of receive a touch of a touching object on the screen; and adjusting light intensity so as to make surrounding pixels of a contact point between the touching object and the screen have a high intensity and rest pixels have no light intensity or a lower light intensity, wherein, the lower light intensity enables content displayed on corresponding pixels perceptible to a user.

According to another aspect of present invention, it is provided an apparatus for displaying content on a screen. The apparatus comprises the screen 201 configured to display the content, wherein light intensity of each pixel of the screen is adjustable; an input module 210 configured to receive a touch of a touching object on the screen; a control module 212 configured to control light intensity of all pixels of the screen 201; wherein, in response to a touch received by the input module 210, the control module 212 adjusts light intensity so as to make surrounding pixels of a contact point between the touching object and the screen 201 have a high intensity and rest pixels have no light intensity or a lower light intensity, wherein, the lower light intensity enables content displayed on corresponding pixels perceptible to a user.

It is to be understood that more aspects and advantages of the invention will be found in the following detailed description of the present invention.

BRIEF DESCRIPTION OF THE DRAWINGS

The accompanying drawings, which are included to provide a further understanding of the, illustrate embodiments of the invention together with the description which serves to explain the principle of the invention. Therefore, the invention is not limited to the embodiments. In the drawings:

FIG. 2b is a diagram showing the state information for all pixels according to the embodiment of present invention;

FIGS. 3a, 3b and 3c are diagrams showing the effect after the introduction of principle of present invention according to the embodiment of present invention;

DETAILED DESCRIPTION

An embodiment of the present invention will now be described in detail in conjunction with the drawings. In the following description, some detailed descriptions of known functions and configurations may be omitted for clarity and conciseness.

The present invention provides a method for saving power consumption of a touch screen by adjusting light intensity or light level of the screen on pixel level, where the pixels of the screen surrounding a contact point between a touching object and the screen surface have a normal light intensity, and the remaining pixels have a lower light intensity than the surrounding pixels or even no light. So the overall time consumption of the screen decreases as the light intensity of some pixels becomes lower. Herein, the normal light intensity corresponds to light intensity enabling content of corresponding pixel perceptible to a user. One typical example for normal light intensity is the light intensity when traditional display screen is in working mode.

Figure 1:
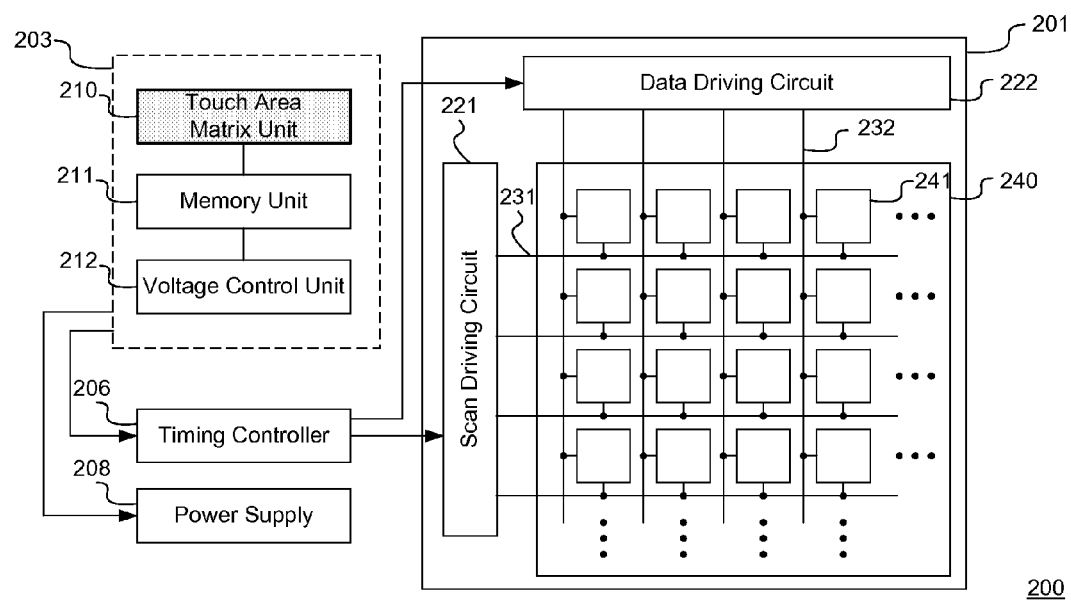
FIG. 1 is a block diagram showing an apparatus for saving power consumption of the display screen according to an embodiment of present invention.

FIG. 1 is a block diagram showing an apparatus for saving power consumption of the display screen according to an embodiment of present invention. In the embodiment, In order to be able to control the light intensity of the screen on pixel level, AMOLED (Active-Matrix Organic Light-Emitting Diode) technology is used. An AMOLED display consists of an active matrix of OLED (Organic Light-Emitting Diode) pixels that generate light (luminescence) upon electrical activation that have been deposited or integrated onto a thin film transistors (TFT) array, which functions as a series of switches to control the current flowing to each individual pixel. Herein, the active matrix refers to the technology behind the addressing of pixels.

As shown in the FIG. 1, the apparatus is a touch-screen display 200. It should note the apparatus can also be integrated into tablet, PC with touch screen etc. The display 200 includes an AMOLED panel 201, a control circuit 203, a timing controller 206, and a power supply 208 for operating the AMOLED panel 201 and the control circuit 203 controls the power supply 208 for adjusting the power to each individual pixels of the AMOLED panel 201.

The AMOLED panel 201 includes a scan driving circuit 221, a data driving circuit 222 and a pixel array 240. The scan driving circuit 221 is electrically coupled to the pixel array 240 through a plurality of scan lines 231, and the data driving circuit 222 is electrically coupled to the pixel array 240 through a plurality of data lines 232. The pixel array 240 has a plurality of pixels 241 arranged to form an array, and each pixel 241 is disposed at the junction between each scan line and data line. Thus the scan driving circuit 221 may generate a scan signal to the pixel array 240 according to the output from the timing controller 206 so that the pixels on each scan line are enabled sequentially. Meanwhile, the date driving circuit 222 generates a data voltage signal to the pixel array 240 according to the output from the timing controller 206 to turn on the enabled pixels 141. In general, the power supply 208 provides voltage to each pixel 241 of pixel array 240.

Figure 2A:
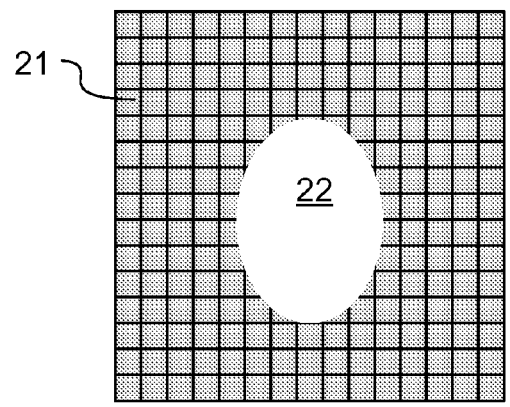
FIG. 2a is a diagram showing a touch on the screen 21 according to the embodiment of present invention.

The control circuit 203 includes a touch area matrix unit 210, memory unit 211 and a voltage control unit 212. The touch area matrix unit 210 provides state information for each pixel 241 according to the contact point or area between the touching object and the screen surface. In the embodiment, the state information is on or off of each pixel, and the surrounding pixels of the contact point have a state of on (represented by 1) and the rest have off state (represented by 0). FIG. 2a is a diagram showing a touch on the screen 21 according to the embodiment of present invention. The surrounding pixels of the contact point are denoted by 22. FIG. 2b shows the state information for all pixels. It shall note that other signs besides 0 and 1 can also be used to indicate the state information. For example, 0 indicates surrounding pixels of the contact point. The memory unit 211 is used to store the state information of all pixels based on inputs from touch area matrix unit 210 by using a matrix of 0 and 1. The voltage control unit 212 controls the power supply 208 to each pixel according to the state information stored in memory unit 211, i.e. the surrounding pixels of the contact point have a normal light intensity and the rest pixels have a lower light intensity or even no light intensity. Herein, all surrounding pixels of the contact point constitute an area with its center or centroid corresponding to the contact point. The area could be in the shape of square, roundness, ellipse, rectangle etc, and the size of area varies with different implementations. For example, in case of roundness of area shape, the size of area is denoted by diameter, e.g. 2 cent meters for 5-inch screen. In case of square of area shape, the area size is denoted by side length, e.g. 2 cent meters for 5-inch screen.

Figure 3C:
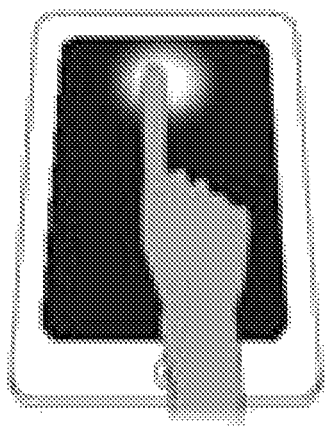

FIGS. 3a, 3b and 3c are diagrams showing the effect after the introduction of principle of present invention according to the embodiment of present invention. FIG. 3a shows a normal mode of the apparatus where pixels of the screen have a normal light intensity; FIG. 3b shows a standby, sleep or shutdown mode where there is no light intensity for each individual pixels of the screen; and FIG. 3c shows when a user touches the screen, surrounding pixels of the contact point between the finger and the screen have the normal light intensity while the rest pixels have no light intensity. According to another embodiment, the rest pixels have a light intensity lower than the surrounding pixels, and the lower light intensity of the rest pixels still enables the content (e.g. text, image etc.) shown by the rest pixels perceptible to the user.

In the embodiment where the rest pixels have no light intensity, power consumption of the screen in connection with time and touch area is shown below:

$$v = C_1 t + C_2 s + C_3 \quad (1)$$

$$s = S_{touched\ area} / S_{total\ area} \quad (2)$$

In above equations, v represents power consumption of the screen; t represents the touch duration time; s represents a rate of surrounding pixels over all pixels of the screen as shown in equation (2) and s $\in$[0, 1]; C1, C2 and C3 are constants.

Figure 4:
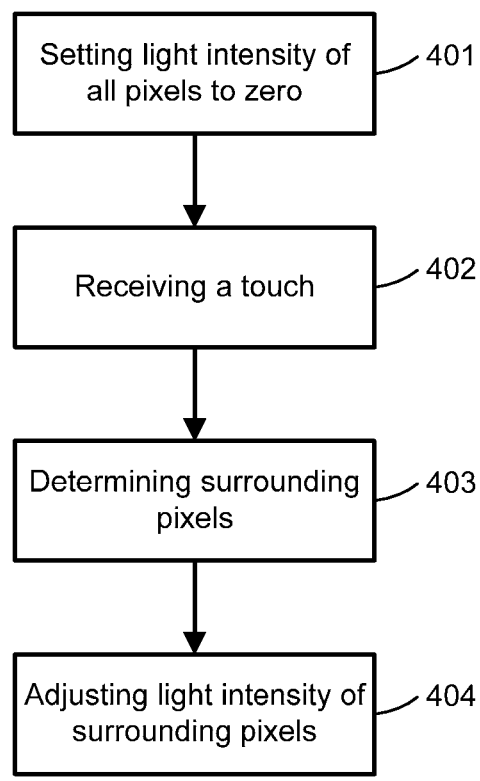
FIG. 4 is a flow chart showing a method for saving power consumption of screen according to an embodiment of present invention.

FIG. 4 is a flow chart showing a method for saving power consumption of screen according to an embodiment of present invention. In the step 401, all pixels of screen are set to have no light intensity. In the step 402, the apparatus 200 receives a figure touch of a user on the screen. In the step 403, the apparatus 200 (to be specific, the touch area matrix unit 201) determines the pixels surrounding the contact point between the user finger and the screen, and stores state information of surrounding pixels in Memory Unit 211. And in the step 404, the apparatus adjusts the light intensity of surrounding pixels from no light intensity to normal light intensity. It is implemented by using Voltage Control Unit 212 to control the power supplied to surrounding pixels.

According to a variant of the embodiment as shown in FIG. 4, there is a step of activating power saving mode before the step 401.

According to another variant of the embodiment as shown in FIG. 4, in the step 401, all pixels of screen are set to have light intensity lower than normal light intensity, but the lower light intensity still enables content of corresponding pixels perceptible to the user. According to another variant, there is a step of activating power saving mode before the step 401. According to another variant, the step 401 is redundant because in the standby mode all pixels have no light intensity or lower light intensity.

According to another variant, the step 401 is redundant, and in the step 403 the apparatus determines the rest pixels in response to a touch on screen with normal light intensity, and in the step 404 the apparatus adjusts the light intensity of the rest pixels to no light intensity or a light intensity lower than normal light intensity.

According to another variant, each surrounding pixel is associated with a timing parameter, and value of the timing parameter indicates when the corresponding pixel is determined as surrounding pixel. The parameter is stored in Memory Unit. Besides, a constant value or a predefined value is also stored in the Memory Unit 211. The Timing Controller 206 counts the time for surrounding pixels, and when the elapse time of a surrounding pixel equals to the constant value or the predefined value, the Timing Controller 206 informs the Voltage Control Unit 212. And the Voltage Control Unit 212 has the light intensity of the surrounding pixel returned to no light intensity or lower light intensity. Moreover, the timing parameter is updated when the corresponding pixel is determined as surrounding pixel, irrespective of whether or not the corresponding pixel has already been determined as surrounding pixel or not.

Figure 5A:
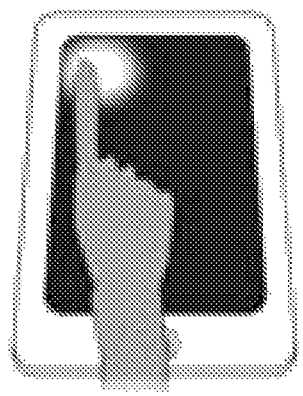
FIGS. 5a, 5b and 5c are diagrams showing effect of a horizontal sliding stroke on the screen according to an embodiment of present invention.
Figure 5B:
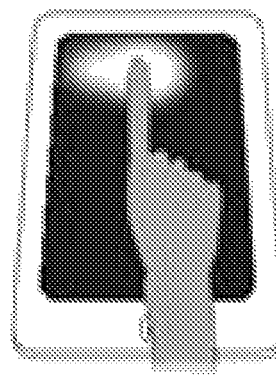
Figure 5C:
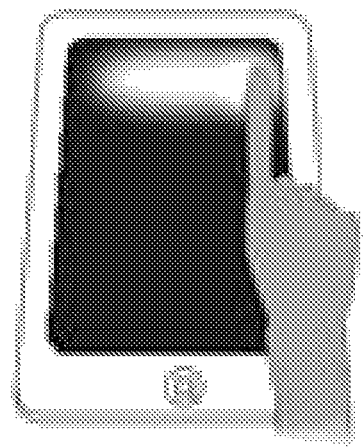

FIGS. 5a, 5b and 5c are diagrams showing effect of a horizontal sliding stroke on the screen according to an embodiment of present invention. In this embodiment, all pixels determined as surrounding pixels during stroke action are set to have normal light intensity.

Figure 6:
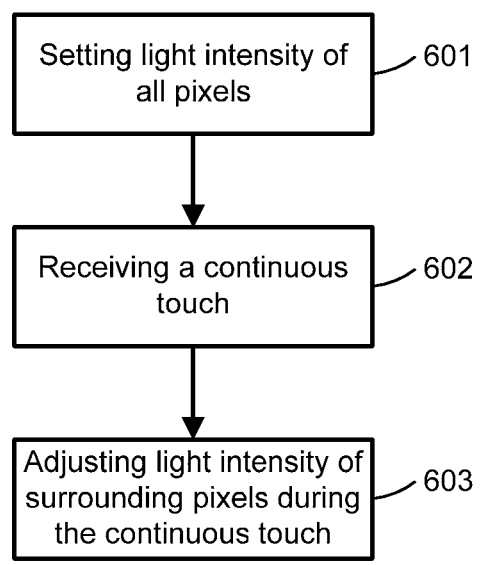
FIG. 6 is a flow chart showing a method for power saving for a stroke action on the screen according to the embodiment of present invention.

FIG. 6 is a flow chart showing a method for power saving for a stroke action on the screen according to the embodiment of present invention. A stoke, from technical perspective, is a continuous move on the surface of some touched object, i.e. screen in this embodiment, while maintaining the contact of the touching object and the touched object. In the step 601, all pixels of the screen are set to have no light intensity or a light intensity lower than the normal light intensity. In the step 602, the apparatus receives a continuous touch or move on the screen while maintaining the contact of the touching object and the screen. Herein, a continuous touch can be considered as plurality of touches along the moving track during the entire stroke action and a single touch in a particular time point. Therefore, surrounding pixels are determined for each time point along the moving track during the entire stroke action, and surrounding pixels for all time points constitute the surrounding pixels for the continuous touch (i.e. stroke). In the step 603, during the continuous touch, the light intensity of determined surrounding pixels are set to have normal light intensity in a timely manner, i.e. as soon as a pixel is determined as surrounding pixel, it is set to have normal light intensity. Herein, when the pixel is determined as surrounding pixel, its state information is stored in Memory Unit 211.

According to a variant, each surrounding pixel is associated with a timing parameter and the timing parameter is timely updated as described above. It is possible that a pixel is determined as surrounding pixel by a previous contact point and a latter contact point of the continuous touch. Herein, the terms of "previous" and "latter" refer to time point when the contact point occurs. In this case, the timing parameter of the pixel is updated with the time value when the latter contact point occurs.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for displaying content on a screen including a plurality of pixels where a light intensity of each of the plurality of pixels is adjustable, comprising:

setting light intensity of all pixels to no light intensity or the lower light intensity;

detecting contact between a touching object and the screen;

adjusting the light intensity of ones of the plurality of pixels surrounding pixels of a contact point between the touching object and the screen to a higher light intensity, wherein the lower light intensity enables content displayed on corresponding pixels to be perceptible;

counting a time from adjustment of the light intensity of the plurality of pixels; and upon expiration of the counted time from adjustment of the light intensity, readjusting the light intensity of the plurality of pixels from the higher light intensity to return to the lower light intensity or no light intensity.

2. The method of the claim 1, further comprising determining the ones of the plurality of pixels surrounding pixels of the contact point, wherein the ones of the plurality of pixels surrounding pixels of the contact point constitute an area with a center or centroid corresponding to the contact point.

3. The method of the claim 2, wherein the area is a shape comprising one of a square, rectangle, ellipse and roundness.

4. The method of the claim 1, further comprising moving the touching object on the touch screen display while maintaining contact between the touching object and the touch screen display, wherein all surrounding pixels of all contact points along a moving track of the point of contact are adjusted to the higher light intensity.

5. An apparatus for displaying content, comprising:

a touch screen display including a plurality of pixels that detects contact between a touching object and the touch screen display;

a controller that controls light intensity of each of the plurality of pixels of the touch screen display;

wherein the controller sets light intensity of all pixels to no light intensity or the lower light intensity and, in response to the detection of contact received by the touch screen display, the controller adjusts the light intensity of ones of the plurality of pixels surrounding a contact point between the touching object and the touch screen display to have a higher light intensity, wherein the lower light intensity enables content displayed on corresponding pixels to be perceptible, a timer that counts a time for maintaining the adjusted light intensity for the plurality of pixels; and upon expiration of the counted time from adjustment of the light intensity, the controller readjusts the light intensity of the plurality of pixels to return from the higher light intensity to the lower light intensity or no light intensity.

6. The apparatus of the claim 5, wherein, the input module receives a continuous touch of the touching object while maintaining contact of the touching object with the screen, and the control module adjusts the light intensity so that all surrounding pixels of all contact points along the moving track have the higher light intensity.

* * * * *